Oct. 25, 1955
J. J. EBERLE
2,721,645
LOADING CONVEYORS
Original Filed July 18, 1947
3 Sheets-Sheet 1
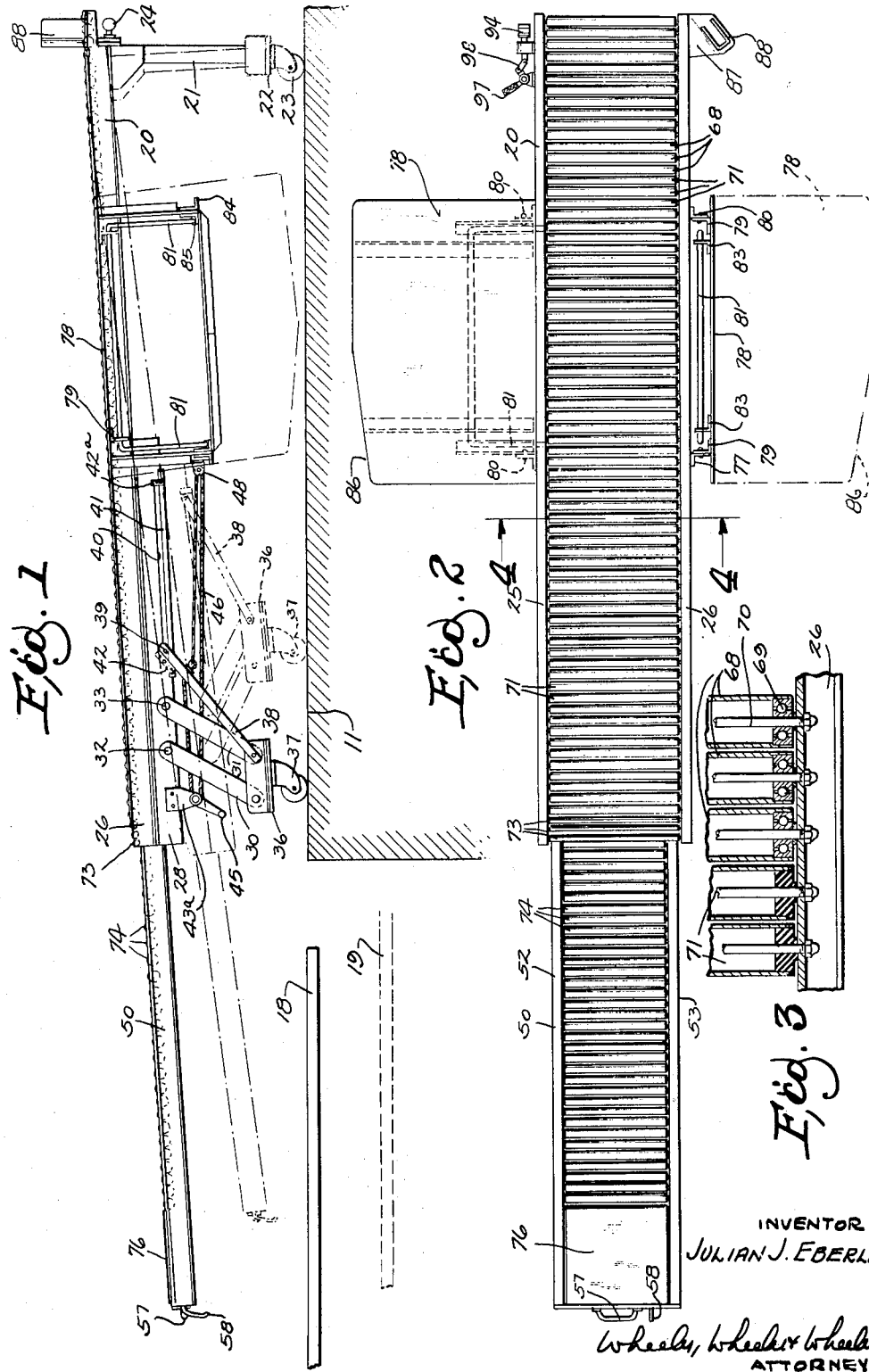
INVENTOR
JULIAN J. EBERLE
Wheeler, Wheeler & Wheeler
ATTORNEYS

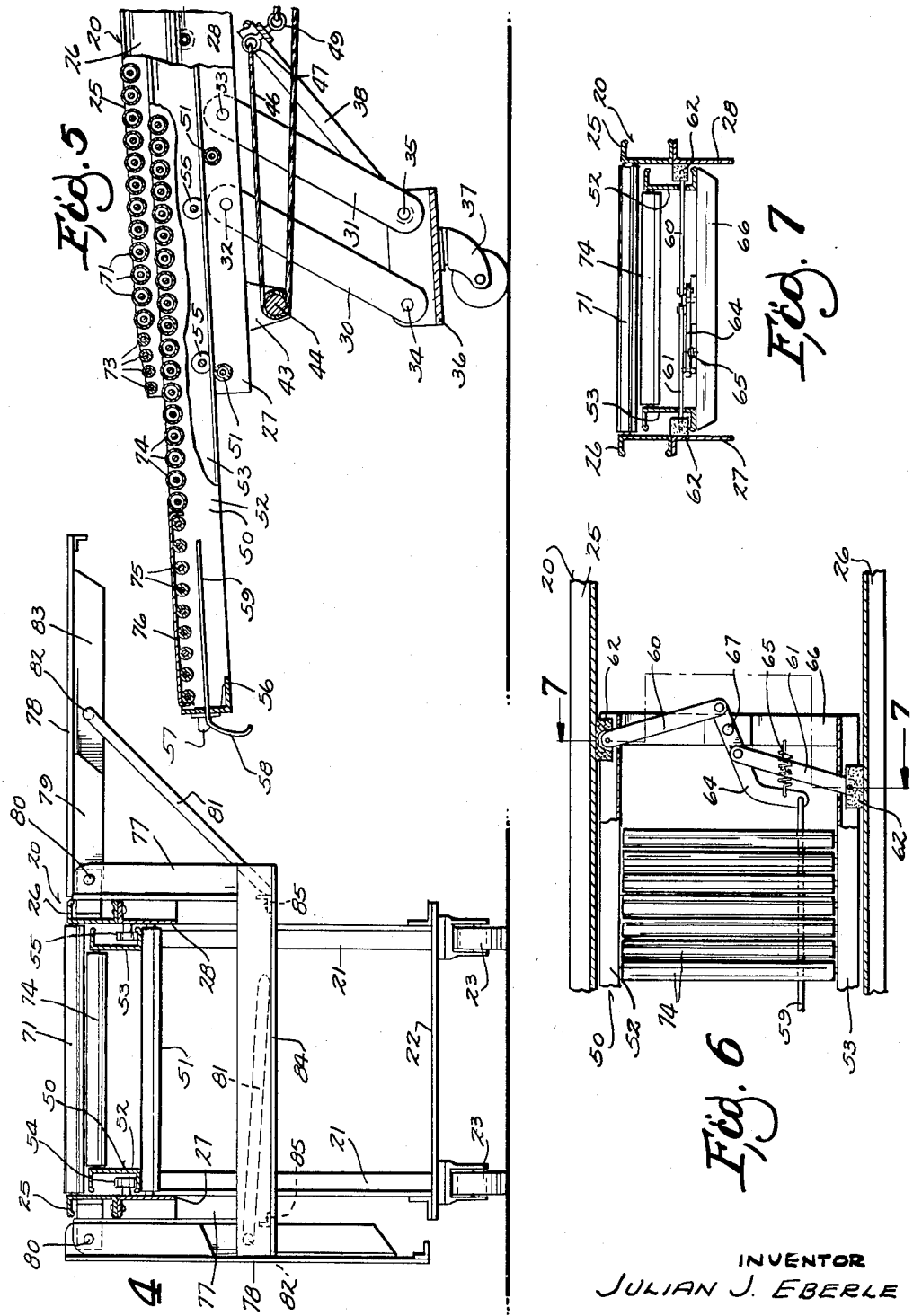

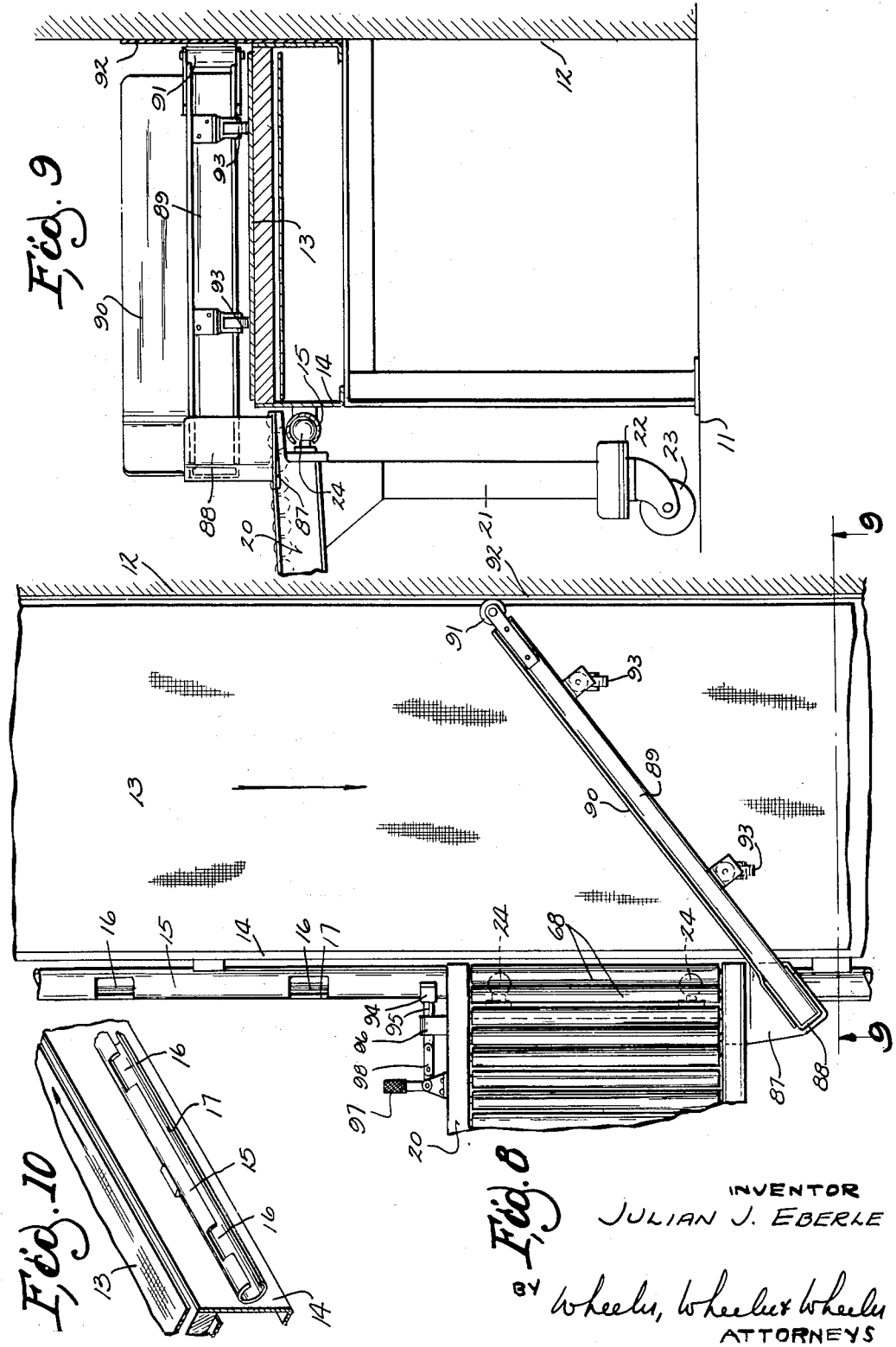

United States Patent Office 2,721,645
Patented Oct. 25, 1955

2,721,645

LOADING CONVEYORS

Julian J. Eberle, Wauwatosa, Wis., assignor to The Journal Company, Milwaukee, Wis., a corporation of Wisconsin Original application July 18, 1947, Serial No. 761,778, now Patent No. 2,627,960, dated February 10, 1953. Divided and this application January 2, 1953, Serial No. 337,418

9 Claims. (Cl. 198—101)

This invention relates to improvements in loading conveyors.

This application is a division of my copending application Serial No. 761,778, filed July 18, 1947, now Patent No. 2,627,960 granted February 10, 1953, and entitled "Loading Conveyors."

It is a primary object of the invention to provide a novel, simple and unusually serviceable conveyor for delivering bundles or packages from a loading platform on to the bed of a truck. More specifically, it is my purpose to provide a conveyor which is not only adjustable in position on the loading platform and adjustable as to height to service trucks with beds of differing heights, but is also telescopically adjustable as to length so that bundles may be discharged in any desired area of the truck bed without having the conveyor itself necessarily supported from such bed.

Purely by way of exemplification, my improved conveyor is described with particular reference to its use for delivering bundles of newspapers or other publications. It will, however, be evident that the conveyor is useful in other fields and, for a more particular indication of its advantages and objectives, reference is made to the following disclosure.

In the drawings:

Fig. 1 is a view in side elevation of a conveyor embodying the invention.

Fig. 2 is a view in plan of the conveyor shown in Fig. 1.

Fig. 3 is an enlarged detail view fragmentarily illustrating in horizontal section some of the rollers used in the conveyor.

Fig. 4 is an enlarged detail view of the conveyor in transverse section on the line 4—4 of Fig. 2.

Fig. 5 is an enlarged detail view in longitudinal section through a portion of the delivery end of the conveyor.

Fig. 6 is an enlarged fragmentary detail view in horizontal section through the rear end of the telescopically extensible portion of the conveyor.

Fig. 7 is a detail view taken in section on the line 7—7 of Fig. 6.

Fig. 8 is a fragmentary plan view showing the adjustable connection of the loading conveyor with the loading platform feeding conveyor.

Fig. 9 is a detail view taken in section on the line 9—9 of Fig. 8.

Fig. 10 is a fragmentary detail view in perspective showing the mounting provided on the feeding conveyor for attachment and adjustment of the loading conveyor.

The present device is particularly adapted for use on a loading platform 11 (Fig. 1) which may project from a building wall 12 (Fig. 9), along which extends the belt conveyor 13 (Figs. 8 and 9). I provide the frame 14 of the belt conveyor 13 with a support 15 comprising a slotted tube, one free margin of which is provided at intervals with notches 16 opening to the slot 17.

Trucks having beds 18, 19 of various heights are backed up to the platform 11. The loading conveyor is made to cooperate with the feeding conveyor 13 for delivering bundles from the canvas belt conveyor to the trucks.

For details of the loading conveyor per se, reference is made to Figs. 1 to 7 inclusive.

The loading conveyor frame 20 is supported at its rear end by legs 21 cross connected at 22 and provided with casters 23. The rear end of this conveyor may also be supported by ball headed connectors 24 in the manner hereinafter to be described.

The frame 20 comprises a pair of channels 25, 26 disposed along the sides of the conveyor back to back and shown in Fig. 4 and Fig. 7. The depth of the frame is increased near its forward end by the angle plates 27, 28 riveted beneath the channels as shown in Fig. 4 and Fig. 7. At each side of the forward end portion of the conveyor frame, there are parallel links 30, 31 pivoted to the angle plates 27, 28 at 32, 33 and pivoted at 34, 35 to a dolly 36 provided with a caster 37.

Also pivoted to the dolly 36 are the control links 38, the upper ends of which are provided with pins 39 (Fig. 1) riding in slots 40 formed by attaching a separate bar 41 to each of the angle plates 28 by means of brackets 42, 42a, which also serve as stops to limit the movement of the pin 39 in the slot 40.

The brackets 43, 43a depending from the angle plates 27, 28 (Figs. 1 and 5) support the shaft of a windlass 44 which is provided with a crank 45. A cable 46 is provided with several wraps around the windlass or drum 44. One end of the cable is connected to the control link 38 at 47. The other end of the cable extends about a pulley 48 fixed to the frame and back to a connection with a link at 49. Thus, by the rotation of crank 45, the control link may be moved to adjust its pin 39 from one end to the other of slot 40 thereby achieving any desired variation in height of the delivery end of the main conveyor frame 20 within the capacity of the device. The two extremes of adjustment are shown respectively in full and dotted lines in Fig. 1. If the links 30 and 31 are nearly upright as shown in the full line position, the delivery end of the conveyor frame will be at maximum height. If the links are collapsed to a nearly horizontal position as shown in dotted lines, the delivery end of the frame will be at minimum height.

In order that the bundles may be delivered over the bed of the truck to a point near its forward end, a telescopically extensible conveyor sub-frame 50 is provided. How the rollers are mounted on the main conveyor frame 20 and the sub-frame 50 for the support of the bundles will later be described.

As best shown in Figs. 4 and 5, the main frame 20 has its downwardly extending plate portions 27, 28 provided with transversely extending rollers 51 upon which the side channels 52, 53 of sub-frame 50 are supported. Channels 52, 53 are laterally spaced from each other and open oppositely. Also carried by the plates 27, 28 of the main frame 20 are guide rolls 54, 55 which engage respectively the horizontal lower flanges of channels 52, 53 to hold the sub-frame 50 to the rollers 51.

Means is provided for clamping sub-frame 50 in any position to which it may be adjusted. The front member 56 of the sub-frame is provided at 57 with a handle for convenient manipulation of the sub-frame by an operator on the track. Adjacent this handle is a brake control handle 58 at the end of a rod 59 which extends longitudinally of the sub-frame to brake mechanism near the rear end thereof as best shown in Figs. 6 and 7.

The webs of channels 52 and 53 are slotted to receive the links 60, 61, each of which carries a brake shoe 62. The links are pivoted to a control lever 64 to which the rod 59 is connected. A tension spring 65 attached to the control lever and to the end member 66 of the sub-frame urges the control lever counterclockwise as viewed in Fig.

6, whereby the links 60, 61 are thrust outwardly to engage their respective shoes 62 with the end faces of plates 27, 28 of the main frame 20. The shoes are normally biased to friction engagement with the main frame, but such engagement is readily released by the operator's pull on the handle 58 of rod 59 to oscillate lever 64 against the tension of spring 65 to retract links 60 and 61 and the respective shoes. The lever 64 oscillates on a fulcrum end 67 fixed in the end member 66 of the sub-frame.

The main conveyor frame 20 and the sub-frame 50 are both provided with closely adjacent transverse rollers upon which work is supported for movement over the conveyor. For reasons hereinafter to be explained, some of these rollers are of special construction. A number of rollers 68 near the input end of the main frame 20 are provided with anti-friction bearings 69 for support from the cross rods 70 upon which such rollers are mounted. The purpose of the anti-friction bearings is to facilitate movement of the bundles on to the main conveyor frame. After the bundles arrive on the main conveyor frame, it is not desired that their progress on the main frame be too rapid. Accordingly, anti-friction bearings are omitted from the remaining rollers 71. Since the rollers 68 and 71 are relatively large in diameter, I provide at the delivery end of the main frame 20 a series of smaller rollers 73 set at progressively lower levels as shown in Fig. 5 to minimize the drop of the bundles from the rollers of the main frame to the rollers 74 on the sub-frame.

At the delivery end of the extension conveyor 50, I provide rollers 75 of somewhat smaller diameter so that over them I may, if desired, place the flanged plate 76, the upper surface of which will be flush with the level of roller 74 to provide a platform (Figs. 2 and 5) on which the bundles will come to rest, to be removed manually by the operator at the delivery end of the apparatus.

At each side of main frame 20, I may provide a pair of longitudinally spaced vertical angle irons 77 for the support of a table 78 which is provided on its lower surface with angle irons 79 (Figs. 1 and 4) pivotally connected to the vertical angle iron 77 by fulcrum bolts 80 upon which the table may be moved from the inoperative position shown at the left in Fig. 4 to an operative horizontal position such as is shown at the right in Fig. 4.

For supporting the table in its operative position, I provide a brace 81 made of wire pivoted at 82 to the reenforcing angles 83 on the under side of the table. The main frame is provided with cross pieces at 84 which extend to, and are connected with, the vertical angle 77. These cross pieces carry stops 85 against which the legs of the U-shaped brace 81 are releasably engaged, no more positive connection being required. To release the brace, the table 78 is lifted slightly to disengage the brace from the flange of the cross member 84, whereupon the table may be lowered to the position shown at the left in Fig. 4.

Because the conveyor slants from its receiving end toward its delivery end, the free margin of each of the tables is preferably beveled at 86 so that when the table is lowered, it will clear the floor in all conveyor positions.

The extensible conveyor may be used in any desired location, but when used with the belt conveyor previously described, it is preferably connected thereto by engaging the ball headed mounting device 24 with the split tube 15 in the manner shown in Fig. 9. This may involve lifting the entire conveyor frame slightly at its receiving end to enable the balls 24 to be introduced into the correspondingly spaced notches 16 in the split tube 15. When the balls enter the interior of the split tube through the notches, the conveyor may then be slid laterally to any desired position along the table 14 of the belt conveyor.

For receiving material from the conveyor belt 13, the conveyor frame 20 is provided at one or both of its receiving end corners with a bracket 87 provided with a channel-shaped seat 88 set obliquely with reference to the longitudinal axis of the frame 20 as best shown in Fig. 8. Into this bracket, I may set, when desired, a deflecting board 89, preferably having a metal face at 90. This board has a roller 91 mounted to bear against the wall plate 92. It is also provided with caster roller supports at 93 which ride directly on the moving belt 13. With the board 89 in place in socket 88, it is held in the desired position by the frictional thrust of conveyor belt 13 and yet it may be moved with the conveyor frame 20 to any desired position along the table on which belt 13 operates.

In any such position the deflector 89 will cause bundles moving on belt 13 to turn and move outwardly on to the rollers of frame 20. To minimize the resistance to such movement, the rollers 68 first encountered by the bundle are provided with anti-friction bearings as above described. The downward pitch of the conveyor frame 20 and its extension takes care of any further movement of the bundles, making further antifriction bearings unnecessary. If the bundles are coming at such a rate that an excess number of bundles accumulates, an operator may deflect some of these on to the tables 78 for temporary storage. Otherwise, the bundles are passed by such operator downwardly along the main frame 20 and on to the extension frame 50. The operator placing the bundles in the truck will adjust the extension frame 50 to any desired extension and upon release by him of the brake control handle 58 the extension frame will automatically be locked in any position of adjustment.

Whether the extension conveyor frame 50 is extended or retracted, the entire lateral conveyor assembly may be adjusted along the slot of tube 15 to any desired position in the whole length of the belt conveyor 13. It is thereby adapted to service a number of trucks successively and it may be positioned accurately with respect to any truck regardless of the precise position in which such truck is backed to the platform. In any adjusted position of the lateral conveyor assembly, the main frame 20 may be locked to tube 15 by means of brake shoe 94 which is mounted on plunger 95, the plunger being reciprocable through the guide 96 by means of bell crank lever 97 and toggle link 98. Fig. 8 shows the toggle link straightened to engage the shoe 94 with tube 15. Fig. 2 shows the shoe retracted by the collapse of the toggle link 98.

It will be observed (Fig. 9) that when the ball 24 is engaged in the tube 15 the caster 23 at the receiving end of the lateral conveyor is lifted slightly from the floor. Thus the rollers at the receiving end of the conveyor depend for their position upon the engagement of frame 20 with tube 15. The two balls 24 (Fig. 8) hold the conveyor frame 20 securely at right angles to the tube and at the proper level with regard to the belt conveyor. The relative positions are maintained despite any angular adjustment of the conveyor frame 20, such frame being supported, while in use, by the casters 37 adjustably connected to its delivery end and the balls 24 which fix the position of its receiving end and preclude movement of the receiving end either vertically, outwardly or inwardly.

I claim:

1. In a conveyor system, the combination with a first conveyor having a frame provided with a longitudinally extending support at its side, of a second conveyor comprising a frame having its end in slidable engagement with said support, the frame of the second conveyor extending outwardly from the side of the conveyor first mentioned, the said longitudinally extending support comprising a slotted tube having spaced openings affording access to the slot, the frame of the second conveyor having headed connectors receivable through said openings and slidable in the slot.

2. In a conveyor system, the combination with a first conveyor and a second conveyor projecting laterally therefrom and provided with an obliquely disposed socket, of a deflecting board extending obliquely across the first conveyor and having its end seated in the socket, the second conveyor being adjustable longitudinally of the first conveyor and said board having rollers supporting it from the first conveyor and an end roller for which said first conveyor has a side support with which such end roller is engaged.

3. A conveyor system comprising a belt conveyor having a support extending longitudinally at one side, a loading conveyor comprising a first frame projecting laterally from said support and having a receiving end slidably engaged with said support, an extension conveyor frame slidable in said first loading conveyor frame and for which the loading conveyor frame is provided with ways, the respective frames being provided with work-supporting rollers, a manually releasable lock mounted on the extension frame and engaged with the first frame of the loading conveyor for maintaining a selected adjusted position of the extension frame, and an adjustable support for the delivery end of the first loading conveyor frame.

4. In a conveyor system, the combination with a fixed first conveyor having a frame provided with a longitudinally extending support at its side, of a second conveyor having a frame projecting laterally from said support and interlocked therewith, means for adjusting the position of said second conveyor longitudinally of said first conveyor, a support for the second conveyor remote from the first conveyor, and an adjustable extension telescopically nested respecting the second conveyor and extensible therefrom beyond the support last mentioned, means for preventing the tilting of the second conveyor by a load upon the said extension beyond the said remote support comprising the said interlocking engagement between said support and said second conveyor frame.

5. In a conveyor system, the combination with a first conveyor having a slotted tube along its side, of a lateral conveyor extending outwardly from the first conveyor and comprising a frame having spaced ballheaded pins, the pins extending through the slot of said tube and the balls being locked therein, whereby said lateral conveyor frame is slidable along said tube while maintained against upward, downward, outward, inward, or lateral swinging movement respecting such tube.

6. The combination set forth in claim 5 in further combination with a brake shoe provided with a mounting on the lateral conveyor frame for movement to and from locking engagement to preclude sliding movement of said frame along said tube.

7. A device of the character described comprising a truck loading dock elevated above ground level and having thereon a still further elevated loading platform set back from the edge of the dock, a first conveyor mounted on said platform and comprising a frame provided with a longitudinally extending support at its side, a second conveyor having a frame extending laterally from said first conveyor, said second conveyor comprising first and second telescopic sections, said first section having means at one end in slidable engagement with said support and being provided near its other end with means for its movable support from said loading dock, and means for supporting said second section solely from said first section when said second section is extended beyond the edge of said loading dock.

8. The device of claim 7 in which said first section is provided with a second means at its said one end for support from the dock when the first mentioned means is disengaged from the longitudinal support on the frame of the first conveyor, whereby the said second conveyor may be moved with a supported load independently of support derived from the first conveyor.

9. The device of claim 7 in which said elevated platform is provided with a vertical guide surface adjacent the side of said first conveyor, said second conveyor being provided with a deflector mounted on the said one end of said first section, said deflector being extended obliquely across said first conveyor and having at its end remote from said second conveyor a roller engaged with said vertical guide surface.

References Cited in the file of this patent

UNITED STATES PATENTS

| 550,744 | Challman | Dec. 3, 1895 |
| 1,168,865 | Drake | Jan. 18, 1916 |
| 2,099,071 | Lundbye | Nov. 16, 1937 |
| 2,169,890 | Zink | Aug. 15, 1939 |
| 2,627,960 | Eberle | Feb. 10, 1953 |

FOREIGN PATENTS

| 372,654 | Germany | Mar. 31, 1923 |